R. E. HELLMUND.
SYSTEM OF CONTROL.
APPLICATION FILED OCT. 3, 1917.

1,321,524.

Patented Nov. 11, 1919.
2 SHEETS—SHEET 2.

WITNESSES:
J. R. Krear.
W. R. Coles

INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,321,524.   Specification of Letters Patent.   Patented Nov. 11, 1919.

Application filed October 3, 1917. Serial No. 194,448.

*To all whom it may concern:*

Be it known that I, RUDOLF E. HELLMUND, a citizen of the German Empire and a resident of Swissvale, in the county of Allegheny and State of Pennsylvania, have invented a new and useful Improvement in Systems of Control, of which the following is a specification.

My invention relates to systems of control, and especially to the automatic control of electric vehicle motors and the like under coasting and preliminary operative conditions.

One object of my invention is to provide a system of the above-indicated character wherein the connection of a main momentum-driven machine to the supply circuit may be effected in a relatively short time interval by reason of a rapid and accurate balancing of the supply-circuit and the machine voltages.

More specifically stated, it is an object of my invention to provide a special form of torque-relay device for effecting the above-mentioned connection of the main machine to the supply circuit under coasting conditions, the corresponding circuits of the main machine and of the relay device being automatically so regulated that the desired rapid and accurately balancing of the voltages in question is secured.

Figure 1:
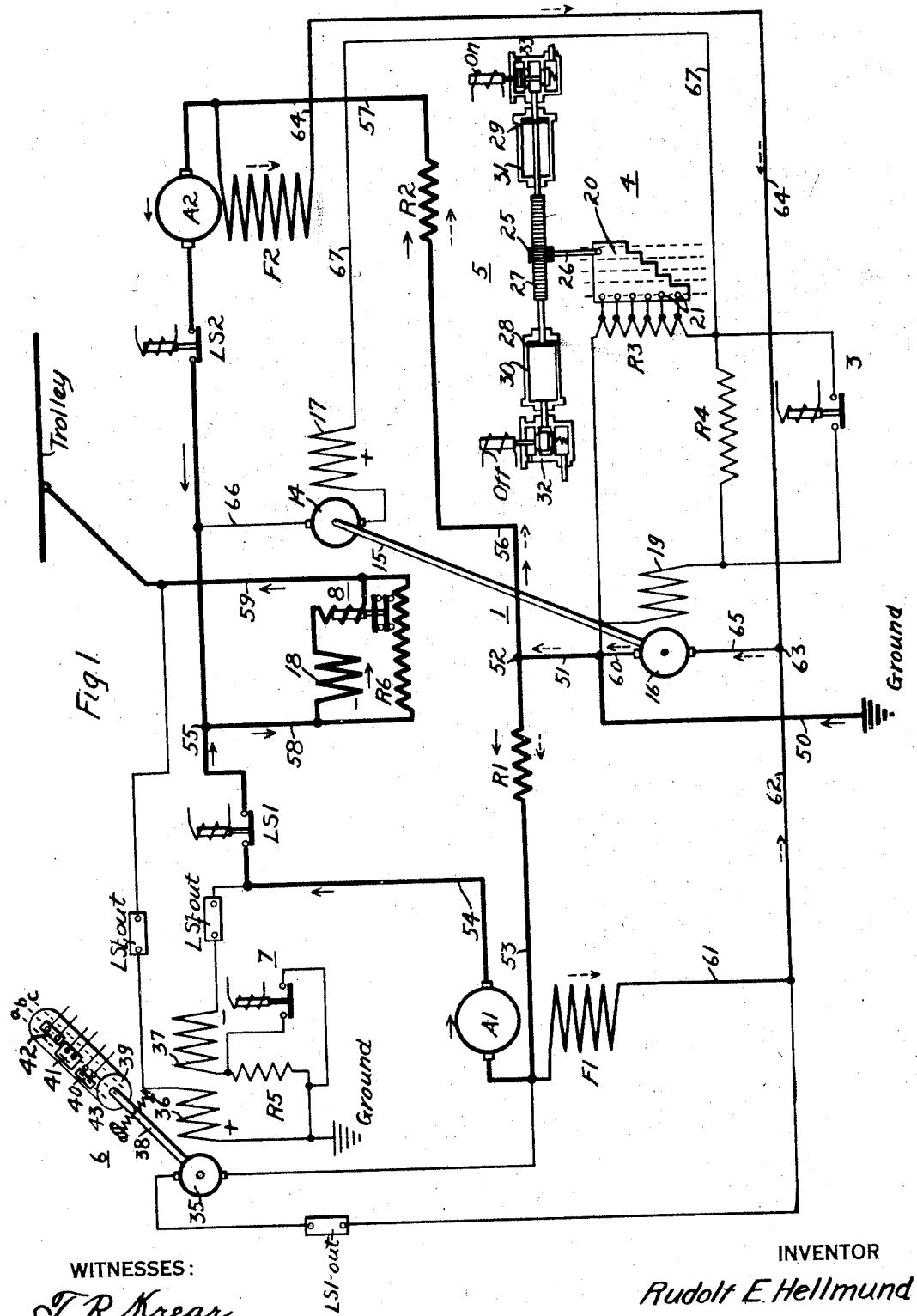
Figure 2:
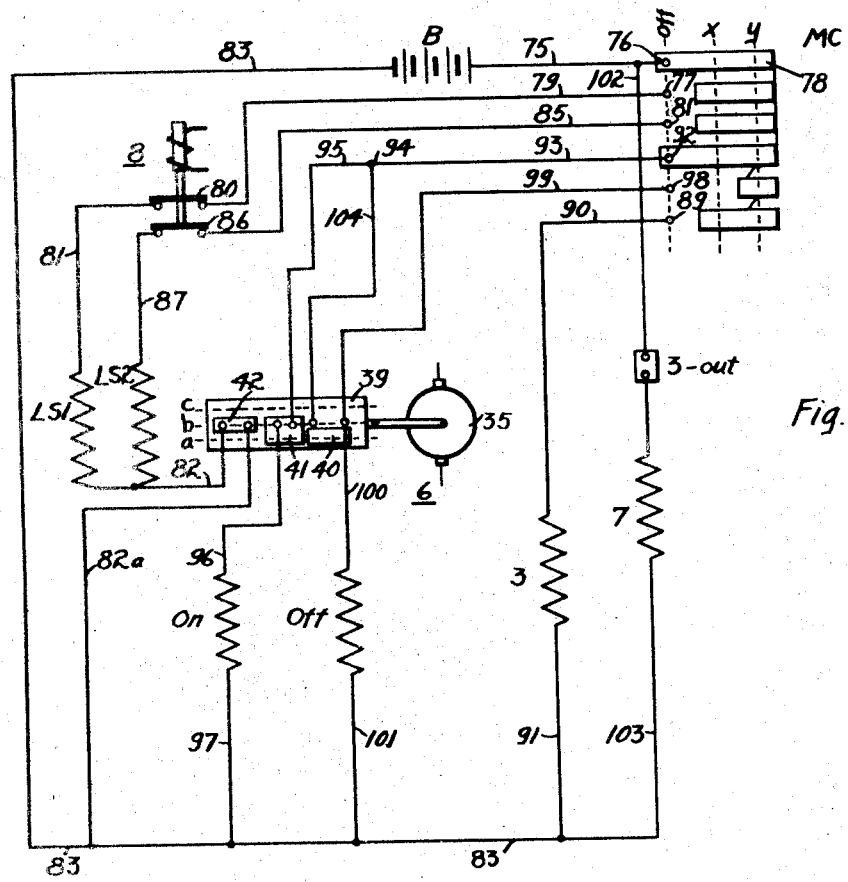
Figure 3:
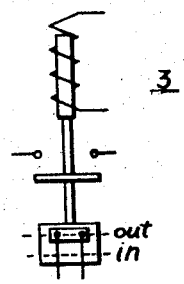

My invention may best be understood by reference to the accompanying drawings, wherein Figure 1 is a diagrammatic view of the main circuits of a system of control embodying the invention; Fig. 2 is a diagrammatic view of an auxiliary governing system for the main circuits of Fig. 1; and Fig. 3 is a detail diagrammatic view of one of the main-circuit switches.

Referring to Fig. 1 of the drawings, the system shown comprises supply-circuit conductors Trolley and Ground; a plurality of main dynamo-electric machines respectively having commutator-type armatures A1 and A2 and field windings F1 and F2 of the series type; an auxiliary motor-generator set 1 that is driven from the supply circuit for the purpose of exciting the main field windings; a plurality of electrically-controlled switches LS1, LS2 and 3; a plurality of main and auxiliary-circuit resistors R1 to R6, inclusive, that are connected in certain circuits, as subsequently traced in detail; a multi-position controller 4 for varying the active circuit value of the resistor R3 in accordance with the movements of an actuating mechanism 5; a motor-type or torque-relay device 6 for automatically effecting the connection of the main machines to the supply circuit, under proper coasting conditions; and a plurality of solenoid-type relay devices 7 and 8 for purposes to be set forth.

The motor-generator set 1 is shown as comprising a motor or driving armature 14 that is mechanically coupled, by a shaft 15, for example, to an exciting or generator armature 16; a plurality of field windings 17 and 18 for the driving armature 14 and a field winding 19 for the exciting armature 16.

The motor armature 14 is driven from the supply circuit, and the field winding 17 therefor is unidirectionally excited, at all times, in this case being connected in series relation with the armature, while the second field winding 18 is energized in accordance with the main-armature current. The arrangement and proportion of parts is such that, during regenerative operation of the main machines, the field winding 18 acts differentially with respect to the allied field winding 17, as indicated by the positive and negative signs, to thus cause opposite variations of the auxiliary-machine speed in accordance with the changes of main-machine current. That is, an increase of regenerated current reduces the total effective field flux for the auxiliary motor armature 14 and thus increases the speed of the motor-generator set to tend to correspondingly increase the main field-excitation, although such tendency is counteracted to a certain extent by the inherent action of the stabilizing resistors R1 and R2, as subsequently described.

On the other hand, during accelerating or motor operation of the main machines, the auxiliary field windings 17 and 18 are cumulatively related by reason of the reversal of current through the field winding 18, but a substantially constant auxiliary-machine speed is maintained under accelerating conditions by reason of the fact that such cumulative action of the auxiliary field windings causes a relatively high degree of saturation in the driving armature 14 and thus, but little effect is produced with respect to auxiliary-machine speed changes as the main-machine current varies.

The controller 4 comprises a contact segment 20 of suitable configuration for successively engaging a plurality of control fingers 21 that are connected to various points of the resistor R3, whereby the active circuit value of the resistor is gradually increased as the speed of the main machine decreases to thus correspondingly augment the energization of the field winding 19 for the exciting armature 16. In this way, the main field-excitation is gradually increased to compensate for the decrease of vehicle speed.

The actuating mechanism 5 for the controller 4 is of a familiar electrically-controlled, pneumatically-operated type, comprising a pinion 25 which is secured to the operating shaft 26 for the controller to mesh with a horizontally movable rack member 27, the opposite ends of which constitute pistons 28 and 29 that travel within appropriate operating cylinders 30 and 31, respectively. A normally open valve 32, having an actuating coil Off, communicates with the outer end of the cylinder 30, while a normally closed valve 33, having an actuating coil On, is associated with the outer end of the other cylinder 31. Fluid pressure is supplied to the valves 32 and 33 from any suitable source (not shown) to normally bias the mechanism to the illustrated position.

The mechanical operation of the apparatus just described may be set forth as follows: Upon concurrent energization of the actuating coils On and Off, the initial unbalanced fluid-pressure conditions are reversed; that is, fluid pressure is admitted through the valve 33 to the cylinder 31 and is released from the cylinder 30 through the valve 32 to the atmosphere. Consequently, a movement of the pistons and of the controller 4 toward the left, in the illustrated case, ensues. To arrest such movement at any time, it is merely necessary to deënergize the off coil, whereupon balanced high-fluid-pressure conditions obtain in the mechanism and a positive and reliable stoppage thereof is produced.

To effect a return movement of the apparatus, the actuating coils On and Off are concurrently deënergized to cause fluid-pressure conditions to revert to the original state and thus produce the desired backward movement.

The torque relay device 6 comprises a commutator-type armature 35 and a plurality of exciting field windings 36 and 37 that are differentially energized, as indicated by the plus and minus signs, in accordance with conditions representing the voltage of the supply circuit and of the main armature A1, respectively. The relay operating shaft 38 is also provided with a small drum or cylinder 39 upon which are mounted a plurality of contact segments 40, 41 and 42 for closing certain auxiliary circuits to be described in connection with Fig. 2 in accordance with the particular position $a$, $b$ or $c$ that the relay device occupies. A plurality of centering springs 43 are provided for normally biasing the relay device to its illustrated intermediate position $b$.

The relay armature 35 is connected, through an electrical interlock LS1—out of the familiar type, that is illustrated in detail in Fig. 3, across the main field winding F1, while the exciting field winding 36 is connected to the supply-circuit conductors through another interlock LS1—out, and the differentially-related field winding 37 is connected from the supply-circuit terminal of the main armature A1 through a third interlock LS1—out and the resistor R5 to ground.

The relay armature 35 is thus energized in accordance with the main-field-winding excitation, while the effective exciting flux that is provided by the differentially-related field windings 36 and 37 assumes a positive or a negative value with respect to the supply-circuit voltage, dependent upon the relative values of the supply-circuit voltage and the main-armature voltage during the coasting period. The direction of excitation of the torque relay device determines the direction of movement thereof to the one or the other of its extreme positions $a$ and $c$, respectively, whereby the actuating mechanism 5 is governed to increase or decrease the main-field excitation to produce a substantial equality of the supply-circuit voltage and the main-machine voltage under coasting conditions, as subsequently described in detail.

The function of the relay device 7 is to short-circuit the resistor R5, under coasting conditions of the main machines, to increase the excitation of the main-armature-energized field winding 37 for the relay device, to compensate for the decrease of main-machine excitation that occurs under coasting conditions by reason of the opening of switch 3 to insert the resistor R4 in circuit with the field winding 19 for the auxiliary exciting armature 16.

Assuming, for example, that the introduction of the resistor R4 into the circuit of the field winding 19, under coasting conditions, reduces the voltage of the exciting armature 16 to approximately one-tenth of its normal strength, thereby avoiding undue heating losses in the excitation circuit, the short-circuit of the resistor R5 in the circuit of the relay field winding 37 will reduce the corresponding circuit resistance to such an extent that a current of approximately ten times the value that would obtain under the weakened main-field excitation conditions or, in other words, substantially the normal value of current, traverses the relay field winding 37 to thus permit the desired normal or fully operative relations in the torque-relay device, irrespective of the reduced field-excitation conditions in the main machine.

The relay device 8 has its actuating coil connected in series relation with the main-current-excited field winding 18 for the auxiliary motor armature 14, and the relay device is thus held in its upper or open-circuit position to prevent the closure of the line switches LS1 and LS2, as subsequently traced in detail, until substantially stable field-excitation conditions obtain in the motor-generator set and in the main machines.

Assuming that the illustrated system is operating under normal regenerative conditions, with the switches LS1, LS2 and 3 closed, the regenerative or main-armature circuit, indicated by the solid arrows, is established from the supply-circuit conductor Ground through conductors 50 and 51 to a junction-point 52, where the circuit divides, one branch including stabilizing resistor R1, conductor 53, main armature A1, conductor 54 and switch LS1 to a second junction-point 55, and the other branch traversing the conductor 56, stabilizing resistor R2, conductor 57, main armature A2 and the line switch LS2 to the junction-point 55, whence a common circuit is continued through conductor 58, field winding 18 for the auxiliary motor armature 14, which field winding is shunted by the surge-absorbing resistor R6, and conductor 59 to the trolley.

The exciting or main-field-winding circuit, indicated by the dotted arrows, is established from the positive terminal of the auxiliary exciting armature 16, through conductors 50 and 51, to the junction-point 52, where the circuit divides, one branch traversing stabilizing resistor R1, conductor 53, main field winding F1 and conductors 61 and 62 to another junction-point 63, and the other branch including conductor 56, stabilizing resistor R2, conductor 57, main field winding F2 and conductor 64 to the junction-point 63, whence circuit is completed through conductor 65 to the negative terminal of the exciting armature 16.

An auxiliary circuit is established from the trolley through auxiliary field winding 18 to conductor 66, whence circuit is continued through the auxiliary motor armature 14, field winding 17, therefor, conductor 67, resistor R4, which is short circuited by the switch 3 under normal operating conditions, field winding 19 for the auxiliary exciting armature 16 and conductor 50 to ground.

The main-circuit arrangement just described is not of my present invention, but is fully set forth and claimed in my copending application, Serial No. 44,443, filed August 9, 1915. The circuit connections, however, are advantageous in producing an inherent stabilizing action, whereby fluctuations of supply-circuit voltage or of main-armature current are counteracted in the following manner: Assuming an incipient increase of regenerated current, which traverses the stabilizing resistor R1, for example, in the same direction as the exciting current for the main field winding F1, a correspondingly increased voltage drop across the resistor R1 occurs to proportionately reduce the voltage available for delivery from the exciting armature 16 to the main field winding F1, thus causing the main-armature current to subside to the normal value. The converse action takes place in the case of an incipient decrease of regenerated current.

Reference may now be had to Fig. 2, wherein the auxiliary system shown comprises the actuating coils of the various switching devices that are shown in Fig. 1, together with auxiliary contact members of the torque relay device 6 and of the field-excitation relay device 7, a master controller MC that is adapted to occupy a plurality of positions Off, $x$ and $y$, and a battery B or other suitable source of auxiliary energy.

Assuming that the regenerative system connections are completed, as previously traced in connection with Fig. 1, corresponding to the occupation of position $y$ by the master controller MC, the auxiliary governing circuits for controlling the operation of the system may be traced as follows: A common energizing circuit is established from the positive terminal of the battery B through conductor 75, control fingers 76 and 77, which are bridged by contact segment 78 of the master controller, conductor 79, bridging contact member 80 of the field-excitation relay device 8 in its lower position, conductor 81, actuating coil of the switch LS1, conductor 82, contact segment 42 of the torque-relay device 6 in its intermediate position $b$, and conductor 82a to the negative terminal of the battery B.

A similar circuit is simultaneously completed from the master-controller contact segment 78 through control finger 84, conductor 85, bridging contact member 86 of the relay device 8, in its lower position, conductor 87, actuating coil of the switch LS2, conductor 82, and thence to the negative conductor 83, as already traced.

A further circuit is also established from the contact segment 78 through control finger 89, conductor 90, the actuating coil of the switch 3 and conductor 91 to the negative conductor 83.

The line switches LS1 and LS2 are thus closed to connect the main machines to the supply circuit, while the resistor R4 is short-circuited by the switch 3 to permit the entire regulation of the field winding 19 for the auxiliary exciting armature 16 by the controller 4.

Another auxiliary circuit is continued from the contact segment 78 through control finger 92, conductor 93, junction-point 94, conductor 95, contact segment 41 of the torque-relay device 6 in either of its positions $a$ or $b$, conductor 96, the actuating coil On and conductor 97 to the negative conductor 83.

A further circuit is completed, in position $y$ of the master controller, through control finger 98, conductors 99 and 100, the actuating coil Off and conductor 101 to the negative battery conductor.

Since the actuating coils On and Off are thus concurrently energized, forward movement of the controller 4 occurs to gradually introduce more and more of the resistor R3 in the circuit shunting the exciting field winding 19 for the auxiliary generator armature 16, thereby increasing the main-field-winding excitation to compensate for the gradual decrease in vehicle speed. Such movement of the controller 4 may be arrested at any time by merely actuating the master controller to position $x$ to deënergize the off coil and thus hold the controller 4 stationary, in accordance with the previously-described operating principles.

Assuming that the master controller has been thrown to its off position to open the switches LS1, LS2 and 3 and thus permit coasting operation of the main machines, the resistor R4 is thereupon connected in circuit with the field winding 19 for the auxiliary exciting armature 16 to thus decrease the excitation of that armature and, consequently, also of the main momentum-driven armatures.

Upon the opening of the switch 3, a new auxiliary circuit is established from the positive battery conductor 75 through conductor 102, interlock 3—out, actuating coil of the relay 7, and conductor 103 to the negative conductor 83, thus actuating the relay 7 to its upper position to short-circuit the resistor R5 for the previously-explained purpose, namely, to maintain normal excitation conditions in the torque-relay device, although the main-field-winding excitation has been materially weakened.

Under such coasting conditions, the torque relay device 6 automatically becomes operative to maintain an approximate balance between the voltage of the supply circuit and the magnified or representative voltage of the momentum-driven armature A1 that corresponds to the excitation of the relay field winding 37.

The balancing action just mentioned is accomplished as follows: In case the supply-circuit voltage, as measured by the relay field winding 36, temporarily exceeds the momentum-driven armature voltage, as reflected in the differentially-related field winding 37, the torque motor armature 35 is actuated to its extreme position $a$, whereby the previously traced energizing circuit for the on coil is maintained and a new auxiliary circuit is continued from the junction-point 94 through conductor 104, contact segment 40 of the torque relay device 6 in its position $a$ and thence, through conductor 100, to the off coil. The concurrent energization of both the on and off coils effects a forward movement of the controller 4 to correspondingly strengthen the excitation of the auxiliary field winding 19 and, therefore, of the main field windings F1 and F2, until an approximately balanced relation exists between the supply-circuit voltage and the magnified main-armature voltage.

On the other hand, if the main-armature voltage as magnified by the relay field winding 37, temporarily predominates over the supply circuit voltage, as measured by the relay field winding 36, the effective flux traverses the relay armature 35 in a reversed direction to cause a correspondingly reversed movement of the relay device to its other extreme position $c$, wherein both the on coil and the off coil are deënergized to cause a backward movement of the controller 4, as previously described, and thus gradually decrease the excitation of the auxiliary field winding 19 by gradually short-circuiting the shunting resister R3 and, consequently, also reducing the main-field winding excitation until a substantially balanced relation exists between the two voltages that it is desired to equalize, when the relay device 6 again occupies its intermediate position $b$ to arrest further movement of the controller 4.

Assuming that the master controller is again returned to either of its operative positions $x$ or $y$, the switch 3 is immediately closed to short-circuit the resistor R4 and increase the main-field-winding excitation, as previously described. The relay device 7 is thereupon immediately opened by reason of the exclusion of the interlock 3—out from the energizing circuit of it actuating coil. Consequently, normal excitation conditions are quickly resumed in the main machine, while the conditions in the relay device 6 are approximately the same as during the coasting period, as already explained. However, the increase of the momentum-driven main-armature voltage to the full value requires a slight degree of operation of the torque-relay device to effect the desired precision of voltage-balancing, and such action is rapidly effected by reason of the previous maintenance of approximate voltage equalization during the coasting period. In this way, the torque-relay device 6 is actuated to its intermediate position b a relatively short time after the train operator moves the master controller to an operative position, and the line switches LS1 and LS2 are thus closed to connect the main machines to the supply circuit, such connection being slightly delayed until field-excitation conditions in the motor-generator set and in the main machines, as reflected in the relay device 8, are substantially stable, to permit the relay device to drop to its lower position and complete the auxiliary circuits for the line switches.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a dynamo-electric machine having an armature and a field winding, of means for effecting an approximate balancing of conditions respectively representing supply-circuit voltage and armature voltage during the coasting period of said machine and for effecting an exact balancing of such representative conditions just prior to connection of the machine to the supply circuit.

2. In a system of control, the combination with a supply circuit and a dynamo-electric machine having an armature and a field winding, of means for exciting said field winding, and means for automatically controlling said exciting means to effect an approximate balancing of conditions respectively representing supply-circuit voltage and armature voltage during the coasting period of said machine, and to effect an exact balancing of such representative conditions just prior to connection of the machine to the supply circuit.

3. In a system of control, the combination with a supply circuit and a dynamo-electric machine having an armature and a field winding, of variable means for exciting said field winding, and means for automatically operating said variable means to effect an approximate balancing of conditions respectively representing supply-circuit voltage and armature voltage during the coasting period, under certain field-excitation conditions of said machine, and to effect an exact balancing of such representative conditions just prior to connection of the machine to the supply circuit, under materially different field-excitation conditions.

4. In a system of control, the combination with a supply circuit and a main dynamo-electric machine having an armature and a field winding, of auxiliary variable dynamo-electric means for exciting said field winding, means for materially reducing such excitation conditions during the coasting period, and relay means energized in accordance with conditions respectively representing supply-circuit voltage and main-armature voltage during the coasting period for automatically varying the effect of said auxiliary dynamo-electric means to produce an approximate balancing of such representative conditions, under such reduced field-excitation conditions of the main machine, and to produce an exact balancing when said reducing means is inoperative just prior to connection of the machine to the supply circuit.

5. In a system of control, the combination with a supply circuit and a dynamo-electric machine having an armature and a field winding, of auxiliary variable means for exciting said field winding, a torque-relay device having component windings respectively energized in accordance with the supply-circuit voltage and the armature voltage during the coasting period for automatically modifying the effect of said exciting means, means for materially reducing the main-armature voltage during the coasting period, means for proportionately increasing the energization of the corresponding relay-device field winding, and means for rendering said reducing means and said increasing means inoperative just prior to connection of the machine to the supply circuit.

6. In a system of control, the combination with a supply circuit and a main dynamo-electric machine having an armature and a field winding, of an auxiliary machine for exciting said field winding, a torque-relay device having component windings respectively energized in accordance with the supply-circuit voltage and the main-armature voltage during the coasting period for automatically varying the excitation of said auxiliary machine, switching means automatically operative to materially reduce the main-armature voltage and to proportionately increase the energization of the corresponding relay-device field winding during the coasting period, and control means for rendering said switching means inoperative just prior to connection of the main machine to the supply circuit.

7. In a system of control, the combination with a supply circuit and a main dynamo-electric machine having an armature and a field winding, of an auxiliary machine for exciting said field winding, a torque-relay device having an armature winding energized in accordance with the main-field-winding excitation and having a plurality of differentially-related field windings respectively energized in accordance with the supply-circuit voltage and the main-armature voltage during the coasting period for automatically varying the excitation of said auxiliary machine, a plurality of translating devices respectively in series-circuit relation with the auxiliary machine field winding and with the relay-device field winding corresponding to the main armature, switching means for rendering said translating devices respectively operative and inoperative during the coasting period, and means for reversing the condition of said translating devices just prior to connection of the main machine to the supply circuit.

8. In a system of control, the combination with a supply circuit and a dynamo-electric machine having an armature and a field winding, of variable means for exciting said field winding, a relay device operated in accordance with the relation of supply-circuit voltage and armature voltage during the coasting period to modify the effect of said variable means, means for materially reducing the armature voltage during the coasting period, and means for automatically maintaining normal energization conditions in said relay device under such reduced main-armature-voltage conditions.

9. In a system of control, the combination with a supply circuit, and a main dynamo-electric machine having an armature and a field winding, of an auxiliary machine for exciting said field winding, a torque-relay device having component windings respectively energized in accordance with the supply-circuit voltage and the main-armature voltage during the coasting period for automatically varying the excitation of said auxiliary machine, switching means automatically operative to materially reduce the main-armature voltage during the coasting period, and means for automatically maintaining normal energization conditions in said relay device under such reduced main-armature-voltage conditions.

10. In a system of control, the combination with a supply circuit and a dynamo-electric machine, of means for exciting said machine, and means for controlling the exciting means in accordance with the speed of the machine during coasting periods to effect an approximate regulation of certain machine conditions and for effecting a more exact control thereof prior to the establishment of operative connections for the machine.

In testimony whereof, I have hereunto subscribed my name this 14th day of Sept., 1917.

RUDOLF E. HELLMUND.